(12) United States Patent
Paulig et al.

(10) Patent No.: US 10,663,983 B2
(45) Date of Patent: May 26, 2020

(54) PILOT CONTROL UNIT, VALVE ARRANGEMENT, AND METHOD FOR THE REGULATED PROVISION OF A FLUID

(71) Applicant: ASCO NUMATICS GMBH, Oelbronn-Duerrn (DE)

(72) Inventors: Martin Paulig, Oelbronn (DE); Harald Steinle, Oetisheim (DE); Felix Ams, Kaempfelbach (DE)

(73) Assignee: Asco Numatics GmbH, Oelbronn-Duerrn (DE)

( * ) Notice: Subject to any disclaimer, the term of this patent is extended or adjusted under 35 U.S.C. 154(b) by 598 days.

(21) Appl. No.: 15/367,498

(22) Filed: Dec. 2, 2016

(65) Prior Publication Data

US 2017/0160753 A1 Jun. 8, 2017

(30) Foreign Application Priority Data

Dec. 4, 2015 (EP) ..................... 15198053

(51) Int. Cl.
| | |
|---|---|
| *G05D 7/06* | (2006.01) |
| *G05B 15/02* | (2006.01) |
| *G05D 16/18* | (2006.01) |
| *G05D 16/20* | (2006.01) |

(52) U.S. Cl.
CPC .......... *G05D 7/0635* (2013.01); *G05B 15/02* (2013.01); *G05D 16/185* (2013.01); *G05D 16/2095* (2019.01)

(58) Field of Classification Search
CPC .. G05B 15/02; G05D 16/185; G05D 16/2095; G05D 7/0635
See application file for complete search history.

(56) References Cited

U.S. PATENT DOCUMENTS

| | | | | |
|---|---|---|---|---|
| 4,658,855 A | * | 4/1987 | Doyle | G05D 7/0635 137/468 |
| 4,706,703 A | * | 11/1987 | Takeuchi | G05D 7/0635 137/487.5 |
| 5,709,526 A | * | 1/1998 | McLeister | F04D 27/0207 415/1 |
| 6,074,461 A | * | 6/2000 | Wilson | G01N 30/28 96/102 |
| 6,338,336 B1 | * | 1/2002 | Iida | F02D 41/0042 123/520 |
| 8,776,536 B2 | * | 7/2014 | Benouali | F25B 41/062 62/222 |

(Continued)

FOREIGN PATENT DOCUMENTS

| | | |
|---|---|---|
| DE | 102010049442 | 4/2012 |
| EP | 2921924 | 9/2015 |

*Primary Examiner* — Kenneth M Lo
*Assistant Examiner* — Mohammad A Rahman
(74) *Attorney, Agent, or Firm* — Collard & Roe, P.C.

(57) ABSTRACT

A valve arrangement for regulated provision of a fluid relies upon a pilot control unit. The pilot control unit includes at least one electrically controlled pilot control valve and one regulating unit coupled to the pilot control unit. The regulating unit is designed for the adaptive, parameter-based regulation of the at least one pilot control valve. The regulation is based on a combined parameter which describes an opening point of the at least one pilot control valve. A determination of the combined parameter is made based on a static component and a dynamic component.

15 Claims, 4 Drawing Sheets

(56) References Cited

U.S. PATENT DOCUMENTS

| | | | |
|---|---|---|---|
| 2010/0161134 A1* | 6/2010 | Takahashi | B60H 1/3208 |
| | | | 700/276 |
| 2011/0132467 A1* | 6/2011 | Conrad | G05D 7/0635 |
| | | | 137/14 |
| 2012/0102980 A1 | 5/2012 | Benouali et al. | |
| 2014/0276698 A1* | 9/2014 | Wittenberger | A61B 18/1492 |
| | | | 606/21 |
| 2015/0268669 A1* | 9/2015 | Vogt | G05D 7/0635 |
| | | | 137/486 |
| 2016/0298401 A1* | 10/2016 | Cotten | E21B 44/00 |
| 2017/0051644 A1* | 2/2017 | Lagerlof | F28F 27/02 |

* cited by examiner

PILOT CONTROL UNIT, VALVE ARRANGEMENT, AND METHOD FOR THE REGULATED PROVISION OF A FLUID

CROSS-REFERENCE TO A RELATED APPLICATION

The invention described and claimed hereinbelow is also described in European Patent Application 15 198 053.9, filed on Dec. 4, 2015. The European Patent Application, the subject matters of which is incorporated herein by reference, provides the basis for a claim of priority of invention under 35 U.S.C. 119(a)-(d).

BACKGROUND OF THE INVENTION

The present invention relates to a device Pilot Control Unit, Valve Arrangement, and Method for the Regulated Provision of a Fluid The present disclosure relates to a pilot control unit for providing a pilot control pressure for a valve unit for a regulated provision of a fluid, wherein the pilot control unit comprises at least one pilot control valve, in particular at least one electrically controlled pilot control valve, and a regulating unit which is coupled to the pilot control unit. The disclosure further relates to a valve arrangement having a pilot control unit of this type. Finally, the disclosure relates to a method for the adaptive, parameter-based regulation of a pilot control pressure for a valve unit for the regulated provision of a fluid and to a corresponding machine control program for carrying out the method.

US 2015/0268669 A1 discloses a device for providing a fluid having a regulated outlet pressure. The known device is provided with a pressure control unit that is controlled via a pilot control pressure and at which an inlet for the fluid, an outlet for the fluid and a first valve unit acting between the inlet and the outlet is provided. The device also is provided with a pilot control unit that provides the pilot control pressure. The pressure control unit comprises a first diaphragm, on which the pilot control pressure acts, and a second diaphragm, which is mechanically coupled to the first diaphragm and on which the fluid having the outlet pressure acts, wherein at least the second membrane mechanically acts on the first valve unit. The pilot control unit comprises, for example, two electrically controlled proportional valves for generating the pilot control pressure, wherein a first proportional valve is provided for increasing the pilot control pressure and a second proportional valve is provided for reducing the pilot control pressure.

The known device already provides for highly precise pressure regulation having accuracies in the range of better than 1%, preferably better than 0.5%. A further advantage of the known device is the low-power pressure regulation, since only a small amount of electrical power is required for operating the pilot control unit. The power requirement and the control performance benefit from the pilot control unit which is designed for controlling the main valve. The pilot control unit also can be referred to as a pilot unit. Valves of the pilot control unit also can be referred to as pilot valves.

A further advantage of the device known from US 2015/0268669 A1 derives from the low-friction mounting of movable parts of the main valve of the device, which also can improve the control performance. Static friction, stick-slip effects and the like can be largely avoided. It is further advantageous that outlet pressures which are provided can assume values that almost reach a level of the inlet pressures. This is because very little energy is required for the pressure control.

It has been shown, however, that there is a need to further increase the accuracy. There is a need for valve arrangements that have a highly stable operating behavior, wherein the accuracy can be influenced by drift or the like preferably only to a low extent or even a negligible extent.

SUMMARY OF THE INVENTION

The present invention overcomes the shortcomings of known arts, such as those mentioned above.

To that end, the present invention presents a pilot control unit for providing a pilot control pressure for a valve unit for the regulated provision of a fluid, wherein the pilot control unit allows for a highly accurate control of the valve unit and compensates for any deviations that may arise due to the individual case or due to operating conditions. The pilot control unit makes it possible to stably operate a valve unit without noticeable changes in the control behavior occurring during operation, which changes act on the pressure and/or the throughput at the outlet of the valve unit; the pilot control unit allows for very precise pressure control. Furthermore, a valve arrangement, which is provided with or coupleable to such a pilot control valve, and a corresponding method for regulating a pilot control pressure for a valve unit for the regulated provision of a fluid are provided within the scope of the present disclosure. A machine control program, which is designed for carrying out the method using a pilot control unit also is provided within the scope of the present disclosure.

In an embodiment, the inventive pilot control unit for providing a pilot control pressure for a valve unit for the regulated provision of a fluid, comprises at least one pilot control valve, in particular at least one electrically controlled pilot control valve, and a control unit which is coupled to the pilot control unit, wherein the control unit is designed for the adaptive, parameter-based regulation of the at least one pilot control valve, wherein the regulation is based on a combined parameter, which describes an opening point of the pilot control valve, the determination of which parameter takes place on the basis of a static component and a dynamic component.

According to the present disclosure, the control of the at least one pilot control valve is not based on a fixed, unchangeable characteristic curve. Instead, this characteristic curve is adapted specifically for the individual case, use, or application. For example, such a characteristic curve of the at least one pilot control valve can be described by an opening point (also referred to as an offset) and an amplification factor (also referred to as gain or steepness). The opening point, in this case, refers to the point at which the pilot control valve is controlled (e.g., is supplied with current) to the extent that movable parts of the valve just start to transition from a standstill to movement. It is understood that such an "offset" can be present not only during the actual opening of the valve, but also during the closing of the valve. In this regard, it is clearly insignificant in this case as to whether valves are provided, which are open or closed in the currentless state. The term "opening point" is therefore intended to be understood as not limiting.

The at least one pilot control valve can be, for example, an electromagnetic proportional valve. The pilot control valve or valves also can be referred to as pilot valves. The fluid to be regulated is a gaseous fluid, such as air or other gases, which are used in the industrial environment, in the laboratory environment or in the medical environment.

For example, the valve arrangement overall can be designed as a 3-way proportional valve having electronic control. The valve arrangement is suitable for challenging applications, in the field of pneumatic control technology. Preferably, the valve arrangement is operable with a deviation of less than 0.5%, preferably of less than 0.25%. The use of two proportional valves for the pilot control of the main valve allows for highly precise regulation of the pressure or the volumetric flow rate. The fluid itself which flows through the valve arrangement is heated, at most, only to an insignificant level.

It is therefore provided that an adaptive offset is used instead of a fixed offset for the pilot control valves, which adaptive offset comprises two components, specifically a static component and a dynamic component. Preferably, the determination of the static component and the dynamic component takes place in different ways, to allow different influential factors or error sources/tolerance originators to be taken into account.

According to an exemplary embodiment of the pilot control unit, the regulation of the at least one pilot control valve takes place based on a parameter set involving adaptive parameters which describe a characteristic curve which describes a relationship between the extent of the opening of the pilot control valve and a control variable, and which is characterized by the opening point and a steepness. In this embodiment, the parameter set forms the combined parameter. A valve characteristic curve exhibits, by way of example, a typical hysteresis form, wherein edges for the opening and the closing of the valve do not overlap. A hysteresis in the pilot control can be avoided, for example, by using two pilot control valves, one of which is used for increasing the pilot control pressure and the other of which is used for reducing the pilot control pressure. Therefore, only one edge is ever used at a time.

In accordance with an aspect of the present disclosure, this characteristic curve is adaptively shifted or changed on a case-by-case basis, to allow for compensation for tolerances, variabilities, temperature effects, and the like.

The adaptation of the corresponding parameters has the advantage that the level of the input signal at which the operating state of the valve (i.e., open or closed) noticeably changes is always known. Therefore, it is possible to induce relatively small changes in the pilot control pressure, whereby, in turn, a more precise regulation of the outlet pressure is made possible.

Preferably, the static component describes an individual variation. The individual variation can be ascertained by measuring, by way of example, e.g., within the production procedure or during the initial start-up of the corresponding pilot control valve. An individual variation of a valve can be due, for example, to tolerances of the magnetic force, the restoring force, and the effective differential surfaces. It is understood that the individual variation does not need to be determined by measuring in every case. Embodiments also are conceivable in which a measurement is carried out, on a lot-by-lot basis. Alternatively, or additionally, an empirical determination and deduction of individual variations is also conceivable.

According to an embodiment of the pilot control unit, the dynamic component is temporally variable, wherein a regulation of the dynamic component takes place based on a setpoint value-actual value comparison which relates to the pilot control pressure. In this way, for example, influential factors and deviations due to operating conditions can be detected and compensated for. The control performance during the operation and the insensitivity to drift and the like can be further increased.

According to one an exemplary refinement, an updating (adaptation) of the dynamic component takes place when the pilot control valve is operated close to the opening point, wherein an historical (previous) value is replaced in the case of a new value for the dynamic component of the opening point. Close to the opening point of the pilot control valve, the edge steepness does not have a great effect on the present operating behavior or on the present operating point. By way of example, the control unit can comprise a faster controller for regulating the dynamic component. The fast controller can be designed as PD controller, for example. Other embodiments are conceivable.

In general, controllers are distinguished according to continuous and discontinuous behavior. Well known continuous controllers include the "standard" controllers with P, PI, PD and PID behavior. In addition, the continuous controllers include various specific forms with adapted behavior, to be able to regulate difficult controlled systems. These include, for example, controlled systems with dead times, with a nonlinear behaviour, with drift of the controlled system parameters and known and unknown disturbance variables. Many unstable controlled systems that can arise, for example, as a result of positive feedback effects (direct feedback) likewise can be managed by conventional linear controllers. Continuous controllers with an analog or digital behavior can be used for linear controlled systems. Digital controllers have the advantage of universal matching to the widest variety of regulation tasks, but slow down the regulation process owing to the sampling time of the controlled variable and computation time when used with fast controlled systems.

Control elements P, D and I, are known in the field of control theory. Proportionally controlled ("P") circuits are simple and have an average speed compared to other controllers. A drawback is the remaining deviation. A "D" control element is a derivative unit. Due to resonances in the system, it can only be used as a controller in combination with controllers with "P" and "I" characteristics. Further, a controller comprising an integrally controlled element ("I") is relatively slow, but can completely eliminate deviations. A PI controller combines the average-speed P controller type with the accurate I controller type. A PI based control circuit is thus precise and has an average speed. The fastest controllers are those with a derivative unit (PD and PID). PD and PID controller are suitable for situations that require a high dynamic response, or where the controlled system itself is already unstable.

Hence, as used herein, a fast controller is a controller having a considerable or even dominant D component. Consequently, a slow controller is a controller having a considerable or even dominant I component.

The adaptation of the dynamic component can include, for example, a determination of the pressure difference across the valve (inlet pressure and outlet pressure). If significant deviations close to the opening point result in this case, an adaptation of the dynamic component can take place.

According to an exemplary embodiment of the pilot control unit, the regulation of the at least one pilot control valve is further based on a parameter describing an amplification factor, the determination of which takes place based on a PWM output signal for controlling the at least one pilot control valve and a detected coil current of the pilot control valve.

Preferably, the at least one pilot control valve is controlled by a pulse-width modulated signal (PWM signal). The amplification factor describes a slope (steepness) of the characteristic curve. The amplification factor also is generally referred to as gain. The amplification factor is dependent on present conditions of use, such as the level of the supply voltage, on the temperature and on the present resistance of the valve coils. These values can change during the operation, but also between two cases of uses.

By way of example, the at least one pilot control valve is controlled by a voltage signal which is in the form of a pulse-width modulated, square wave voltage signal. This signal can initially correspond to the PWM output signal or be based thereon. The detected coil current is dependent, on the one hand, on the present PWM output signal and, on the other hand, on the pilot control valve itself (e.g., on the resistance of the valve coils). For example, valve coils can heat up during the operation. This has effects on the electrical resistance that presently exists. Fluctuations in the supply voltage also can directly affect the detected coil current of the pilot control valve via the PWM output signal.

The regulation of the amplification factor or the parameter which describes the amplification factor in the characteristic curve for regulating the pilot control valve provides for an adaptation of the slope or inclination of the characteristic curve forming the basis for the present regulation. In this way, the characteristic curve (described by the essential parameters opening point and amplification factor) can be even better adapted to individual variations and changing operating states.

According to an exemplary embodiment, the control unit comprises a slow controller for adjusting the amplification factor. In this manner, the situation is taken into account, for example, in which the measurement of the coil current itself does not take place highly dynamically. A slow regulation or readjustment includes, by way of example, mean values of applied variables, which are determined over time periods of 1 s (second), up to 10 s or even more. Such a slow adjustment is not disadvantageous, since, for example, temperature-related deviations also do not take effect in the detected coil current abruptly, but rather only after a relatively long time period. Therefore, a correction factor for the amplification factor can be derived based on averaged variables. The correction factor itself also can be averaged (e.g., moving averaging).

Therefore, the correction factor can be applied to an inlet value for the pulse-width modulation, and so, ultimately, a correction of the PWM duty cycle takes place, which adjusts the resultant coil current in the direction of the desired setpoint current. The slow regulation therefore provides for a corrected, adapted implementation of a setpoint current signal in the PWM stage.

According to an exemplary embodiment of the pilot control unit, two electrically controlled pilot control valves designed as proportional valves are provided, wherein a first pilot control valve is provided for increasing the pilot control pressure and a second pilot control valve is provided for reducing the pilot control pressure, and wherein the pilot control valves are preferably individually regulated. It is understood that each of the two pilot control valves can have individual variations or deviations in respect of the opening point and the amplification factor of the characteristic curve. For example, the first pilot control valve is fluidically connected on the inlet side to an inlet of the valve unit. The outlet of the first pilot control valve can therefore be fluidically connected to the inlet of the second pilot control valve. The outlet of the second pilot control valve can be designed, for example, as a vent.

According to an exemplary embodiment of the pilot control unit, the pilot control unit further comprises at least one temperature sensor for detecting a coil temperature of the at least one pilot control valve. Preferably, the control unit is designed for temperature compensation. A temperature of the coils themselves, but also an ambient temperature, can influence the control action. A temperature sensor, which is designed in a way suitable for the pilot control unit, provides for the detection, to a certain extent, of the influences of external temperature changes and internal temperature changes. A signal provided by the temperature sensor can also be used for adapting the characteristic curve on which the regulation of the pilot control valves is based.

The valve arrangement for the regulated provision of a fluid comprises a valve unit, which can be regulated via a pilot control pressure, for providing a fluid having a regulated outlet pressure or a regulated volumetric flow rate, and wherein the valve arrangement is provided with a pilot control unit according to at least one of the aspects described here.

In an exemplary embodiment, the valve arrangement is designed for regulating gaseous fluids highly precisely with a good response characteristic and considerable repeatability with very low hysteresis, wherein a pilot control unit having a power requirement of less than 5 W is provided. According to this embodiment, a flow (volumetric flow rate) of 1200 l/min (liters per minute), for example, is achieved. In this case, inlet pressures of approximately 0 bar to 12 bar can be processed and, depending on the inlet pressure, outlet pressures of approximately 0 bar to 10 bar can be provided. It is understood that these characteristic values merely illustrate an example and are not intended to be considered limiting.

According to an exemplary embodiment of the valve arrangement, a first pressure sensor is provided for detecting an inlet pressure of the valve unit, a second pressure sensor for detecting an outlet pressure of the valve unit, and a third pressure sensor for detecting a pilot control pressure of the pilot control unit. In this way, highly precise regulation and monitoring of the regulating process can take place using only three pressure sensors. Preferably, the pilot control unit at the inlet of a pilot control valve used for increasing the pilot control pressure, is fluidically connected to an inlet of the valve unit. In this way, the inlet pressure detected by the first pressure sensor also is the inlet pressure of the pilot control valve.

Another embodiment includes a method for the adaptive, parameter-based regulation of a pilot control pressure for a valve unit for the regulated provision of a fluid, wherein the method includes the following steps:
  determining a combined parameter, which describes an opening point of the at least one pilot control valve, including determination of a static component and a dynamic component of the parameter, and
  electrically controlling at least a pilot control valve, preferably of a first pilot control valve and a second pilot control valve, on the basis of the parameter.

In this way, for example, an offset of a characteristic curve utilized for controlling the at least one pilot control valve can be shifted, to account for individual variations and/or changing operating states. Preferably, the determination of the combined parameter takes place separately for the first pilot control valve and the second pilot control valve, if present.

According to an exemplary embodiment, the method further includes the following steps:

regulating the at least one pilot control valve on the basis of adaptive parameters which describe a characteristic curve which describes a relationship between the extent of the opening of the pilot control valve and a control variable, and which is characterized by the opening point and an amplification factor (steepness), and adaptively adjusting the parameters for the extent of opening and the control variable, in accordance with the operating state of the valve unit.

According to another embodiment, the method further includes the following steps:

controlling a first pilot control valve for increasing the pilot control pressure, and controlling a second pilot control valve for reducing the pilot control pressure.

The invention also includes a machine control program having program code which is designed for triggering a control unit of a pilot control unit for a valve unit to carry out the steps at least of an exemplary embodiment of the method for regulating a pilot control pressure when the machine control program is run on a data processing system which is coupled to the control unit.

A machine control program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible device or apparatus that can contain, store, communicate, propagate, or transport the program for use by or in connection with the instruction execution device.

Insofar as embodiments of the disclosure have been described as being implemented, at least in part, by software-controlled data processing devices, it will be appreciated that the non-transitory machine-readable medium carrying such software, such as an optical disk, a magnetic disk, semiconductor memory or the like, also is considered to represent an embodiment of the present disclosure.

The control is easily influenced in this way. Monitoring and documenting the function of the valve arrangement or the pilot control unit for regulating the valve arrangement are also simplified. Embodiments also are conceivable in which the machine control program runs on a stationary device or computer which, if necessary, is integrated into the control unit or is operably coupled thereto. Embodiments also are conceivable, however, in which the machine control program runs on a mobile terminal, for example, on a portable computer, a terminal, a tablet, a mobile phone, or the like.

BRIEF DESCRIPTION OF THE DRAWINGS

Further advantages and embodiments result from the following description and the attached drawings, wherein.

DETAILED DESCRIPTION OF THE PREFERRED EMBODIMENTS

The following is a detailed description of exemplary embodiments of the invention depicted in the accompanying drawings. The exemplary embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
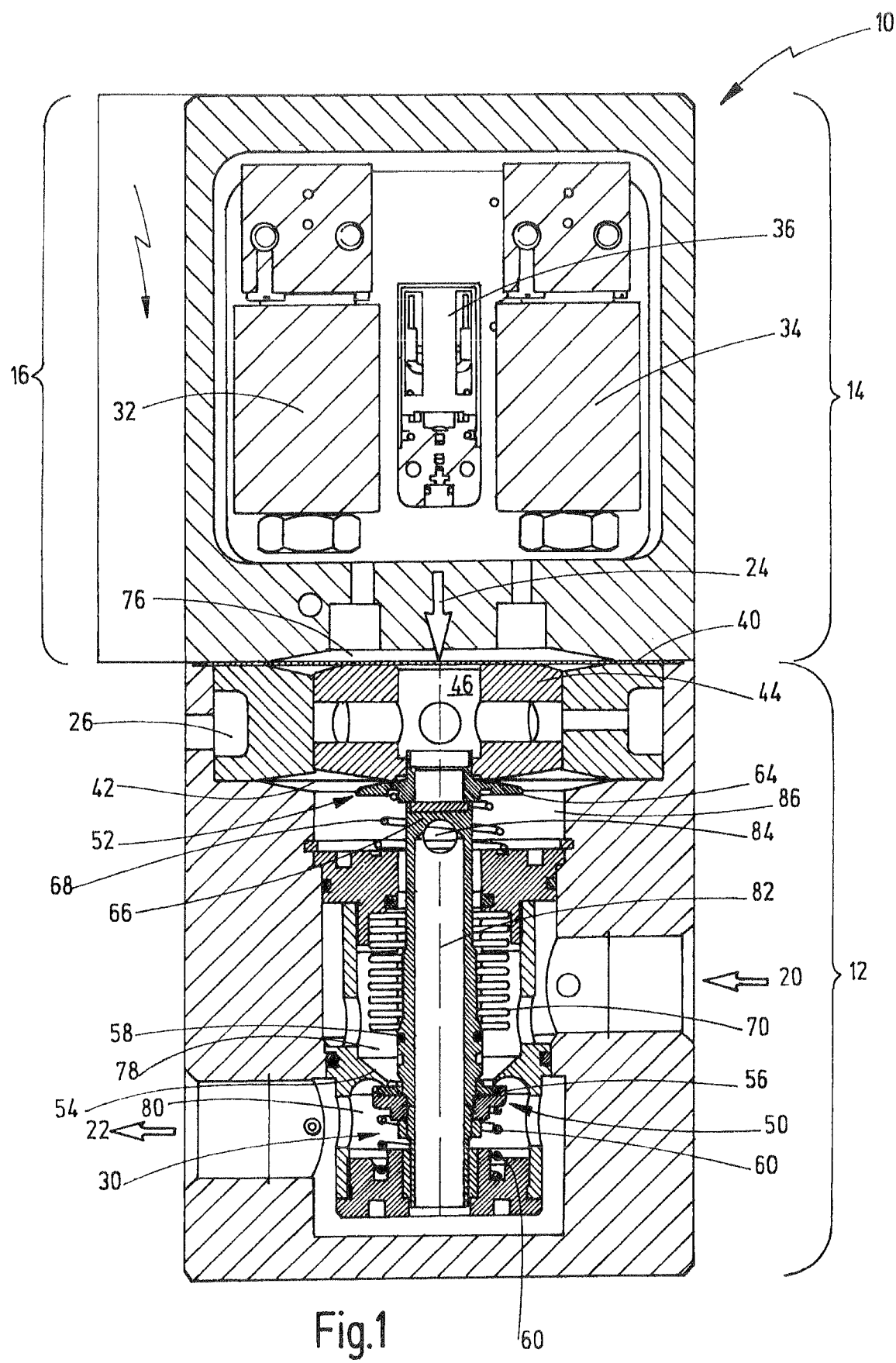
FIG. 1 shows a schematic longitudinal view of an exemplary embodiment of a valve arrangement.

FIG. 1 illustrates, based on a longitudinal view, an exemplary embodiment of a valve arrangement 10 designed for the highly precise regulation of an outlet pressure or a volumetric flow rate, according to exemplary embodiments of the disclosure. The valve arrangement 10 has a modular design and comprises a valve unit 12 and a pilot control unit 14. A control unit 16 (indicated merely schematically in FIG. 1) also is assigned to the pilot control unit 14. The valve unit 12 also may be referred to herein as a main valve unit. The pilot control unit 14 also may be referred to herein as a pilot unit.

The valve unit 12 includes different connections for a fluid to be regulated. The fluid is a gaseous fluid, for example, air or the like. The valve unit 12 is provided with an inlet 20 and an outlet 22. A fluid under pressure is usually present at the inlet 20. At the outlet 22, the fluid can be provided with a regulated pressure or with a regulated volumetric flow rate. Furthermore, a connection 24 for the pilot control is provided, at which a pilot pressure or a pilot control pressure is present. Usually a media transfer does not take place at the connection 24. Finally, the valve unit 12 comprises a vent connection 26, via which venting can take place.

The valve unit 12 comprises a valve 30, which also can be referred to as a main valve. The valve 30 is embodied as mechanical valve and can be fluidically controlled via a pilot pressure or a pilot control pressure. The pilot control unit 14 includes at least one pilot control valve 32, 34. By way of example, a first pilot control valve 32 and a second pilot control valve 34 are provided. The pilot control valve 32 is provided, by way of example, for increasing pressure. The pilot control valve 34 is provided, by way of example, for decreasing pressure. Via the pilot control valves 32, 34, the pilot control pressure can be regulated in a suitable way, to act on the valve 30 via the connection 24. Furthermore, the pilot control unit 14 is provided, by way of example, with a safety valve 36 which brings about a defined operating state in the case of a defect or an interruption of a supply voltage. By way of example, the pilot control valves 32, 34 are designed as so-called 2/2 normally closed (NC) valves. The pilot control valves 32, 34 can also be designed as proportional valves.

The pilot control valves 32, 34 are furthermore designed, by way of example, as so-called NC valves, i.e., as valves which are closed in the currentless state (NC=normally closed). The safety valve, however, can be designed as a so-called NO valve (NO=normally open), i.e., as a valve which is open in the currentless state. In this way, it is ensured that venting of the pilot control unit 14 takes place in the case of a defect or an interruption of the supply voltage, and so the valve 30 can be deactivated.

The valve unit 12 can be operated by the pilot control unit 14 in such a way that the valve arrangement 10 overall functions as a 3/3 NC control valve (three connections, three switching positions), wherein the valve 30 overall can be operated as a proportional valve. The pilot control unit 14 acts on a diaphragm 40 via the connection 24. The diaphragm 40 acts on a connecting piece 44 interposed between the diaphragm 40 and a further diaphragm 42. The diaphragms 40, 42 are accommodated, by way of example, on the valve arrangement 10 to be fixed to the housing, and are fixedly interconnected via the connecting piece 44 and can be moved in unison with each other. A pilot control pressure, which is present in the diaphragm 40 and triggers a movement of the diaphragm 40, is converted via the connecting piece 44 into a movement of the (inner) diaphragm 42. The connecting piece 44 comprises a hollow space or an intermediate space 46 which is connected to the vent connection 26.

The valve 30 of the valve unit 12 comprises a first valve portion 50 and a second valve portion 52. The first valve portion 50 includes a seat 54 which cooperates with a plate 56. The valve 30 further comprises a movable plunger 58, on which the plate 56 is accommodated, by way of example. By a movement of the plunger 58, the plate 56 can come to rest sealingly against the seat 54 or can be moved away from the seat 54. Depending on whether the plate 56 sealingly rests against the seat 54 or not, a fluidic connection is established between the inlet 20 and the outlet 22. Furthermore, assigned to the first valve portion 50 is a spring 60 which acts upon the plate 56 in the direction of the seat 54.

The second valve portion 52 of the valve 30 includes a seat 64 and a plate 66. By way of example, the plate 66 is formed on an axial front end of the plunger 58. The seat 64 is accommodated on the connecting piece 44, wherein the diaphragm 42 is interposed between the seat 64 and the connecting piece 44. The seat 64 extends through the diaphragm 42 and is provided with a central hole. Furthermore, assigned to the second valve portion 52 is a spring 68 which is supported against the housing and acts upon the (deflectable) seat 64 in the direction of the diaphragm 40. The seat 54 is accommodated to be fixed to the frame. The seat 64 can be moved jointly with the connecting piece 44 when the diaphragms 40, 42 are deflected.

Furthermore, a compensating element 70, which is designed as a metal bellows, by way of example, is accommodated on the plunger 58. The compensating element 70 is designed for compensating for pressure fluctuations in the valve unit 12. The compensating element 70 smooths undesirable pressure fluctuations on the input side.

To increase the pressure at the outlet 22 of the valve unit 12, the pressure-increasing pilot control valve 32 is controlled, to increase the pressure in a pilot control chamber 76 which adjoins the diaphragm 40. Therefore, an increased pressure can be applied to the diaphragm 40 via the pilot control 24, and so the diaphragm is deflected. The deflection or movement of the diaphragm 40 is transferred via the connecting piece 44 onto the diaphragm 42 and onto the seat 64. The deflection of the seat 64 is transferred via the plate 66 to the plunger 58, and so, ultimately, the plate 56 is released from the seat 54 of the first valve portion 50. In this way, a fluidic connection is established between an inlet chamber 78 and an outlet chamber 80 of the valve unit 12, and so fluid present at the inlet 20 can flow in the direction of the outlet 22.

As a result, the pressure in the outlet chamber 80 is increased. The outlet chamber 80 is fluidically connected to a blind hole 82 in the plunger 58. The blind hole 82 leads into at least one opening 84 which has a connection to a coupling chamber 86. Pressure is therefore also increased in the coupling chamber 86. In this way, the fluid under pressure can act on the diaphragm 42 in the direction of the diaphragm 40 in opposition to the pilot control pressure (arrow 24). In this way, a state of equilibrium can be achieved.

To reduce the pressure, the second pilot control valve 34 can be activated, to reduce a pressure in the pilot control chamber 76. Provided a sufficiently high pressure is present in the coupling chamber 86, the seat 64 and the diaphragm 42 can be deflected in the direction of the diaphragm 40. The spring 68 also can contribute thereto. The plunger 58 has only limited travel available in the direction of this movement. If the movement of the seat 64 and the diaphragm 42 exceeds a maximum travel of the plunger 58, the seat 64 lifts off the plate 66. A fluidic connection is established between the coupling chamber 86 and the intermediate chamber 46, whereby a venting of the coupling chamber 86 takes place via the vent 26. In this manner, excess pressure is reduced, and so the valve unit 12 can be regulated to a (lower) target pressure.

Advantageous operating modes of the pilot control unit 14 or the regulating unit 16 which relate to the control of the pilot control valves 32, 34 are explained in greater detail in the following.

Figure 2:
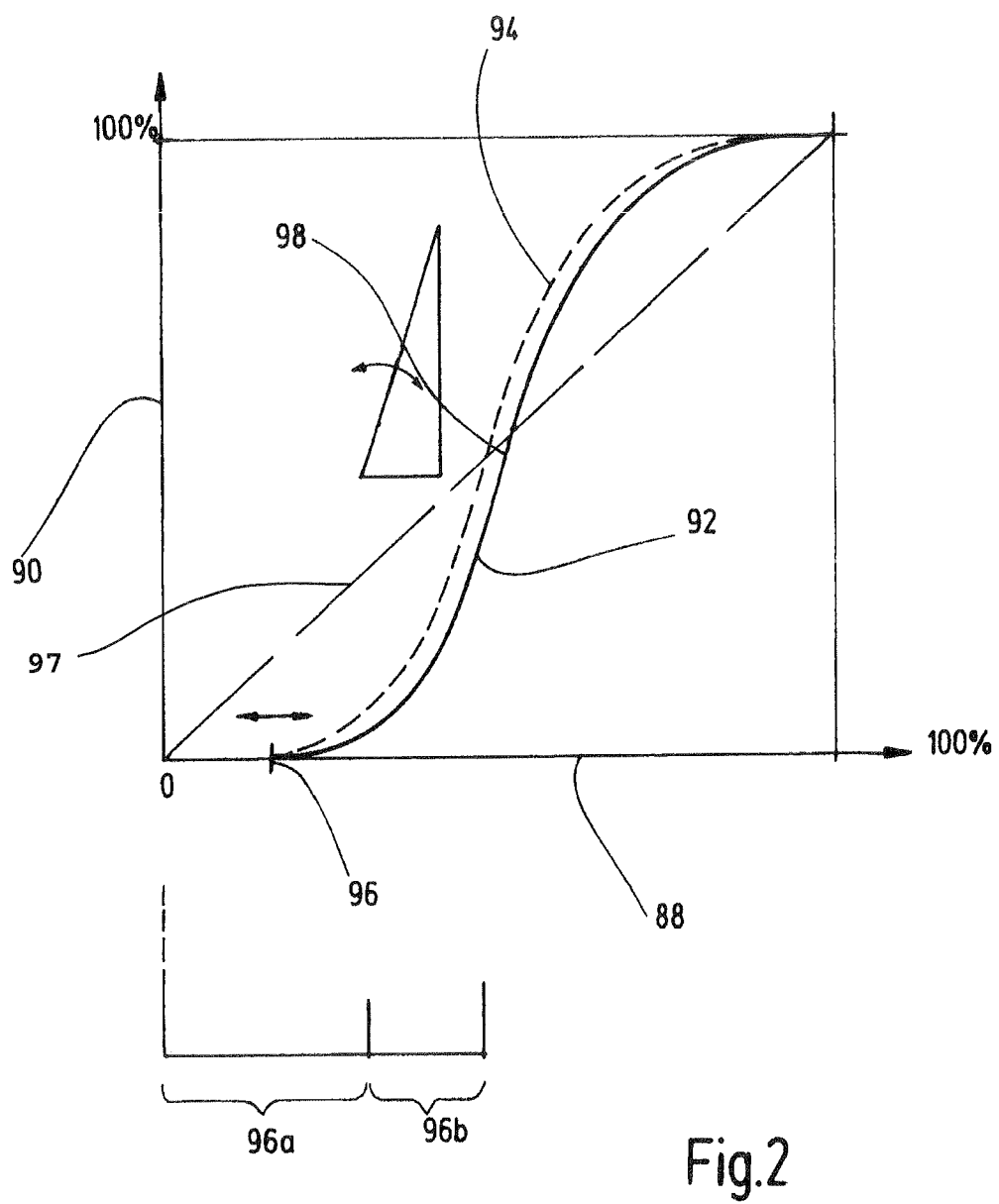
FIG. 2 shows a schematic, highly simplified representation of a characteristic curve of a valve.

FIG. 2 shows an exemplary shape of a characteristic curve for controlling a pilot valve based on an exemplary, highly simplified representation. In FIG. 2, an x-axis labeled with 88 illustrates a control signal (e.g., a control voltage or a resultant current). An associated y-axis, which is labeled with 90, describes an associated extent of opening (e.g., flow) of a valve. The axes 88, 90 merely illustrate qualitative values. A resultant characteristic curve of a valve is described by paths or edges 92, 94. As used herein, the term edge relates to a signal graph illustrating characteristics of a valve. By way of example, the edge 92 describes an opening process of the valve. Therefore, the edge 94 describes a closing process of the valve. Valves driven by electromagnets usually have a hysteresis, and so the edges 92, 94 do not overlap in practice.

An imaginary, ideal characteristic curve 97 of a valve 30 is illustrated in FIG. 2 by a dashed line which, as a diagonal, connects zero points and maximum values of the axes 88, 90.

The characteristic curve of the valve has different characteristic parameters. A first parameter is the opening point or offset 96. A region between a zero point and the opening point 96 can also be referred to as the dead zone. Furthermore, a flank steepness (edge steepness) is labeled with 98 in FIG. 2, which flank steepness can also be referred to as an amplification factor or gain. Even if characteristic curves of valves from a series usually have a very similar shape, deviations resulting from individual variations do occur. The deviations can relate to the opening point 96 and the steepness 98. In other words, the characteristic curve can be shifted (along the axis 88) or tilted, at least in sections.

According to the present disclosure, approaches are presented for how the pilot control valves 32, 34 can be controlled, wherein the regulation is based on an "adaptive" characteristic curve.

FIG. 2 further illustrates, based on an enlarged representation of the dead zone (region between the zero point and the opening point 96), a static component 96a and a dynamic component 96*b* of the opening point or offset 96. The static component 96*a* can account for, for example, individual variations or the like. The dynamic component 96*b* can account for, for example, changing operating conditions or the like.

Figure 3:
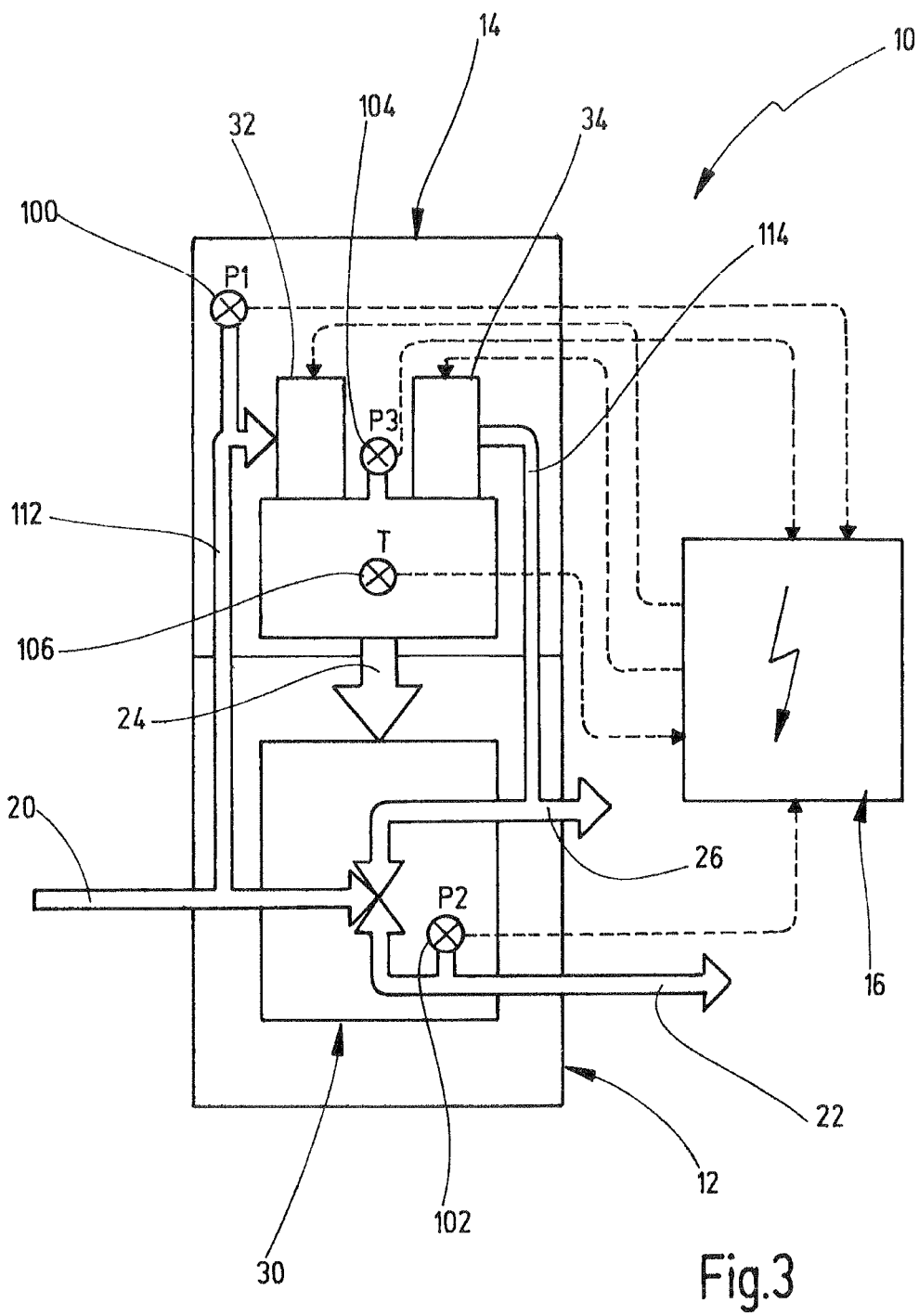
FIG. 3 shows a schematic, highly simplified block diagram of an exemplary embodiment of a valve arrangement.
Figure 4:
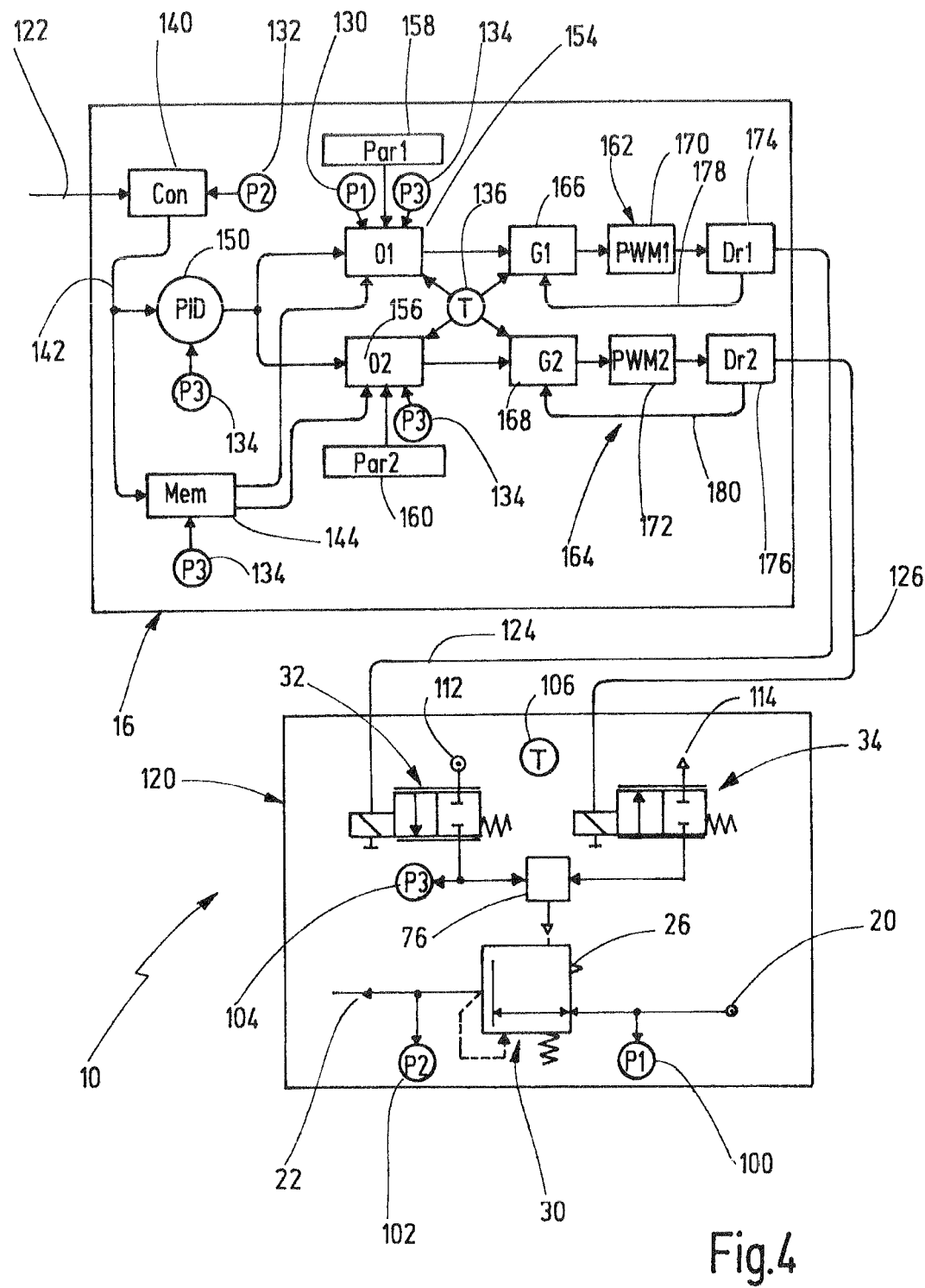
FIG. 4 shows a further schematic, highly simplified block diagram of a valve arrangement for illustrating a control.

FIGS. 3 and 4 illustrate, based on schematically highly simplified block diagrams with the use of symbols, a valve arrangement 10 which, in principle, can be designed according to the cross-sectional view in FIG. 1, in terms of structure. It is understood that modifications and alternative embodiments of the structure are conceivable, and which may be operated and controlled according to the present disclosure, however.

FIG. 3 shows a block diagram of the valve arrangement 10 which is provided with a valve unit 12, a pilot control unit 14, and a control unit 16. The valve unit 12 includes a valve 30 which is situated between an inlet 20 and an outlet 22, to provide a pressure-regulated or flow-rate regulated fluid at the outlet 22.

The pilot control unit 14 is provided with a first pilot control valve 32 and a second pilot control valve 34 in a manner which was already described above, in principle. The first pilot control valve 32 is used for increasing a pilot control pressure in a pilot control chamber 76. The second pilot control valve 34 is used for reducing the pressure in the pilot control chamber 76 (FIG. 2). Via the pilot control chamber 76, a pilot control pressure or a pilot pressure can be provided, which acts on the valve 30 for the regulation thereof, i.e., a block arrow 24 in FIG. 3.

FIG. 3 further illustrates, by way of example, a sensor configuration of the valve arrangement 10. Preferably the valve arrangement 10 comprises three pressure sensors 100, 102, 104. The exemplary embodiment described regarding FIG. 3 further includes a temperature sensor 106.

The first pressure sensor 100 detects an inlet pressure at the valve 30. The inlet 20 of the valve 30 is further connected to an inlet of the pilot control valve 32 which is used to increase the pressure. In this regard, the first pressure sensor 100 also detects an inlet pressure of the pilot control valve 32. The second pressure sensor 102 detects a pressure at the outlet 22 of the valve 30. The pressure detected by the second pressure sensor 102 is the target pressure to be regulated. The third pressure sensor 104 detects a pressure in the pilot control chamber 76. Therefore, the third pressure sensor 104 detects an inlet pressure of the pilot control valve 32 or an inlet pressure of the second pilot control valve 34.

Furthermore, assigned to the valve arrangement 10 is at least one temperature sensor 106 which is provided in the pilot control unit 14, by way of example. The temperature sensor 106 can detect, for example, a coil temperature of the pilot control valves 32, 34, at least indirectly. In addition, the temperature sensor 106 also can be used for determining the ambient temperature or the temperature of the fluid. A temperature compensation can take place based on measured values which the temperature sensor 106 has determined.

A connecting line for fluidically connecting the inlet of the valve 30 and the inlet of the pilot control valve 32 is labeled with 112. The pilot control valve 34 is used for reducing pressure. Therefore, the pilot control valve 34 also can be referred to as a vent valve. An outlet of the pilot control valve 34 is coupled via a fluid connection 114 to a vent 26 of the valve 30, cf. also the representation of the vent 26 in FIG. 1. It is understood that a (discrete) fluid connection 114 between the vent 26 of the valve 30 and the outlet of the pilot control valve 34 does not necessarily have to be provided. Instead, the valve 30 and the pilot control valve 34 can alternatively vent into the surroundings (atmosphere).

A block labeled with 16 in FIG. 3 illustrates the control unit. In FIG. 3, dashed lines illustrate signal paths between the valve unit 12, the pilot control unit 14, and the control unit 16. Output signals from the pressure sensors 100, 102, 104 and the temperature sensor 106 are fed to the control unit 16. The control unit 16 controls the pilot control valves 32, 34, to generate a pilot control pressure or pilot pressure for controlling the valve 30 of the valve unit 12.

FIG. 4 illustrates an exemplary embodiment of the control unit 16. The control unit 16 is coupled to a valve block 120 which combines the valve unit 12 and the pilot control unit 14 with the valves 30, 32, 34. Conceivable structural embodiments can be seen in FIGS. 1 and 3. FIG. 4 also indicates, using symbols, the pressure sensors 100, 102, 104 and the temperature sensor 106 which are assigned to the valves 30, 32, 34.

The representation selected in FIG. 4 further illustrates an exemplary embodiment of a method for regulating a pilot control unit, according to at least one aspect of the present disclosure.

An arrow labeled with 122 illustrates a setpoint value which is fed to the control unit 16. This setpoint value 122 can be, for example, a setpoint pressure or a setpoint flow at the outlet 22 of the valve 30. The setpoint value 122 is converted via the control unit 16 into control variables or control signals 124, 126, based on which the pilot control valves 32, 34 are controlled. The pilot control valves 32, 34 are designed, by way of example, as electromagnetically actuated proportional valves which are closed in the currentless (inactive) state. The inlet of the pilot control valve 32 is connected via an inlet line 112 to the inlet 20 of the valve 30, see also FIG. 3. The outlet of the pilot control valve 34 includes a vent line 114 which, similarly to the vent of the valve 30, vents into the surroundings.

Pressure signals which are generated by pressure sensors 100, 102, 104 are transmitted to the control unit 16, cf. a first pressure signal 130, which is provided by the first pressure sensor 100, a second pressure signal 132, which is provided by the second pressure sensor 102, and a third pressure signal 134, which is provided by the third pressure sensor 104. A temperature signal, which is provided by the temperature sensor 106, is labeled with 136 in FIG. 4. The signals 130, 132, 134, 136 are used by the control unit 16 for regulating the valve block 120 and for adjusting or adapting the control action. According to at an exemplary embodiment, the control unit 16 is further designed for temperature detection and temperature compensation. Therefore, the temperature signal 136 can be considered at least in some regulating steps and control steps.

The setpoint value signal 122 is fed to a process controller (control) 140. Furthermore, the second pressure signal 132, which describes an actual pressure at the outlet 22 of the valve 30, is fed to the process controller 140. Therefore, the process controller 140 can determine a control difference. The process controller 140 determines a setpoint pilot control pressure 142. The setpoint pilot control pressure 142 is fed to a controller 150. The controller 150 is designed as a PID controller, by way of example. Furthermore, the pressure signal 134, which describes an actual pressure of the pilot control chamber 76, is fed to the controller 150. The process controller 140 is further coupled to an offset memory (memory) 144, to update a stored value for the offset or the opening point of at least one of the valves 32, 34. The third pressure signal 134 can also be fed to the offset memory 144. Parameters stored in the offset memory 144 can comprise a static component and a dynamic component, as described above.

The valve arrangement 10 includes two pilot valves, specifically the first pilot control valve 32 for increasing pressure and the second pilot control valve 34 for reducing pressure. Preferably, the two pilot control valves 32, 34 are controlled individually. Therefore, the control unit 16 for each of the pilot control valves 32, 34 comprises a closed loop or an open loop.

The controller 150 outputs a control variable for each of the valves 32, 34 as necessary, which control variable was determined based on a characteristic curve or a parameterization which is characterized by an opening point (offset) and an amplification factor (gain). A processing and adaptation of the offset parameters is illustrated in FIG. 4 with blocks labeled with 154, 156. The control variable is fed to the blocks 154, 156. Furthermore, an historic offset value can be provided to the blocks 154, 156 via the offset memory 144. The block 154 is assigned to the first pilot control valve 32. The block 156 is assigned to the second pilot control valve 34.

Furthermore, parameter values stored in a parameter memory 158 are fed to the block 154. These can be, for example, static parameters which describe individual variations or the like. In addition, the block 154 is supplied with the first pressure signal 130 and the third pressure signal 134. Parameter values 160 which describe static parameters, for example, are fed to the block 156. Furthermore, the third pressure signal 134 is fed to the block 156. The blocks 154, 156 can trigger a dynamic adaptation of the opening points or offset values of the pilot control valves 32, 34.

In addition to the opening point, the characteristic curve of the pilot control valves 32, 34 is further characterized by the amplification factor (gain or edge steepness). An adaptation of the amplification factor takes place preferably by a slow readjustment feedback control. This involves temporal averages of involved values over relatively long periods, by way of example, over time periods of at least 1 second and up to 10 seconds. The control signal 124 for the first pilot control valve 32 is determined based on the determined offsets (block 154) and a controller 162 for the amplification factor. The controller 162 includes blocks 166, 170, 174.

Similarly, the determination of the control signal 126 for the second pilot control valve 34 takes place based on an offset value provided by the block 156 and based on the controller 164 for the amplification factor, which includes blocks 168, 172, 176. Blocks 166, 168 describe a determination or correction of an amplification factor. A setpoint signal for the control signal 124, 126 is fed to the blocks 166, 168. The particular setpoint signal is converted, in the blocks 170, 172, into a PWM signal, wherein, for example, an adjustment of the duty cycle takes place. The PWM signal, which is provided by the blocks 170, 172, is amplified, by way of example, by output stages 174, 176, which provide a voltage signal, based on which the coil windings of the pilot control valves 32, 34 are controlled. In this case, a current measurement takes place, cf. the arrows 178, 180. The current measurement allows for a determination of an actual signal, specifically an actual current, in a particular coil of the pilot control valves 32, 34 acted upon with the control voltage. The actual signal determined in this way is fed to the blocks 166, 168, to allow for an adaptation of the amplification factor. The temperature signal 136 can be fed to the blocks 166, 168 as a further input value or control value. The controllers 162, 164 are preferably designed as slow controllers, to allow changes in the operating behavior of the pilot control valves 32, 34 to be taken into account with a greater time horizon (time window approximately 10 s).

The control action of the valve arrangement 10 can be further improved by at least one of the aspects described here. That is, a control algorithm is provided, which further increases the control performance on the basis of the pressure at the outlet 22 of the valve 30 and on the basis of the pressure in the pilot control chamber 76. Furthermore, the use of a temperature sensor, which is assigned to the control unit 16, is provided. Overall, an optimal adaptation of the characteristic curve (switching points and steepness) of the pilot control valves 32, 34 for controlling the pressure control valve 30 is improved based on three pressure sensors, one of which detects the pressure at the inlet of the valve 30 and the temperature sensor. Overall, the valve 30 can therefore control with minimal hysteresis.

An exemplary embodiment of the present disclosure is designed for regulating the control signal (voltage signal) 124, 126, with which the pilot control valves 32, 34 are controlled, to account for or compensate for the operating behavior of the solenoids of the pilot control valves 32, 34. In this case, it is provided that the coil current through the coils of the pilot control valves 32, 34 is measured, cf. the arrows 178, 180 in FIG. 4, for example. A so-called slow current regulation is provided. Accordingly, the coils of the pilot control valves 32, 34 are not controlled directly with the determined PWM value (for example, the determined duty cycle for the given conditions), but rather corrects this value in the sense of a feedback control.

The following therefore applies:

$$\text{PWM} = \text{Setpoint current} * \text{Correction factor} \qquad (1)$$

In this regard, a value provided by the actual pressure controller is no longer interpreted as a direct PWM value, but rather as a setpoint value for the current. The PWM value, which is now output by the PWM block (see reference numbers in FIG. 4), is corrected by a correction factor, cf. the equation (1), above.

The correction factor is variable and is not necessarily constant. To determine the correction factor, a measurement of the actual current (see the arrows 178, 180) in the coils of the pilot control valves 32, 34 takes place. The PWM value, as an equivalent of the setpoint current, is compared with the measured actual current:

$$\text{Correction factor} = \text{PWM}/(\text{actual current}) \qquad (2)$$

In this way, an adjustment takes place via the resultant correction factor if the actual current is too high or too low.

Furthermore, a temporal smoothing is provided, to compensate for highly dynamic temporal fluctuations in the applied variables. A smoothing can take place, for example, with a time scale (window width) in the range from 1 s up to 5 s, 10 s or even more. Preferably, a downstream correction takes place in this case, for example, via a moving mean value for the applied variables.

A (temporal) smoothing of the actual current, of the PWM value, and of the correction factor can take place, for example, via PT1 elements (first-order lag element). In the following, variables characterized by an overstrike describe (temporally) averaged values:

$$\overline{\text{Current}} = (1-a) * \overline{\text{Current}} + a * \text{Current} \qquad (3)$$

$$\overline{\text{PWM}} = (1-a) * \overline{\text{PWM}} + a * \text{PWM} \qquad (4)$$

$$\text{Correction factor} = \frac{\overline{\text{PWM}}}{\overline{\text{Current}}} \qquad (5)$$

-continued $$\overline{\text{Correction factor}} = \qquad (6)$$
$$(1-a)*\overline{\text{Correction factor}} + a*\text{Correction factor}$$

$$PWM = \text{Setpoint current} * \overline{\text{Correction factor}} \qquad (7)$$

Therefore, the correction factor based on averaged variables. The correction factor itself is (temporally) averaged again. According to the equations (1) to (7), above, the desired dynamic control behavior is either not or only slightly delayed or damped. A time scale in the second's range (for example, 10 s) is sufficient, to compensate for (e.g., temperature-induced) deviations resulting during operation of the valve arrangement 10.

In this way, pronounced fluctuations in the supply voltage, for example, can also be compensated for, and so no disadvantageous effects result in the operating behavior of the valve arrangement 10.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A valve arrangement for regulated provision of a fluid, comprising:
    a valve unit; and
    a pilot control unit coupled to the valve unit and being configured for providing a pilot control pressure for the valve unit, to output fluid with a regulated outlet pressure or volumetric flow rate, wherein the pilot control unit comprises:
        at least one pilot control valve; and
        a control unit coupled to the pilot control unit;
    wherein the control unit regulates the at least one pilot control valve based on a combined parameter that describes an opening point of the pilot control valve; and
    wherein the combined parameter is determined based on a static component and a dynamic component,
        wherein the control unit further regulates the at least one pilot control valve based on a parameter set involving adaptive parameters that describe a characteristic curve,
        wherein the parameter set is formed from the combined parameter;
        wherein the characteristic curve describes a relationship between an extent of an opening of the at least one pilot control valve and a control variable,
        wherein the characteristic curve is characterized by an opening point and a steepness of the curve,
        wherein the static component describes an individual variation determined by measuring,
        wherein the dynamic component is temporally variable, and
        wherein the control unit regulates the dynamic component based on a setpoint value-actual value comparison that relates to the pilot control pressure.

2. The valve arrangement according to claim 1, wherein the control unit updates the dynamic component when the at least one pilot control valve approaches the opening point; and wherein the updating includes replacing an historical value of the dynamic component of the opening point with a new value for the dynamic component of the opening point.

3. The valve arrangement according to claim 2, wherein the control unit comprises a fast controller for regulating the dynamic component.

4. The valve arrangement according to claim 1, wherein the steepness of the curve is determined based on a PWM output signal for controlling the at least one pilot control valve and a detected coil current of the at least one pilot control valve.

5. The valve arrangement according to claim 4, wherein the control unit provides a slow readjustment control of the steepness of the curve.

6. The valve arrangement according to claim 1, wherein the at least one pilot valve embodies first and second electrically controlled, proportional pilot control valves; and wherein the first proportional pilot control valve is provided for increasing the pilot control pressure and the second proportional second pilot control valve is provided for reducing the pilot control pressure.

7. The valve arrangement according to claim 6, wherein the first and second proportional pilot control valves are individually regulated.

8. The valve arrangement according to claim 1, further comprising at least one temperature sensor for detecting a coil temperature of the at least one pilot control valve; and wherein the control unit provides for temperature compensation.

9. The valve arrangement according to claim 1, wherein the at least one pilot control valve is an electrically controlled pilot control valve.

10. The valve arrangement according to claim 1, further comprising:
    a first pressure sensor for detecting an inlet pressure of the valve unit;
    a second pressure sensor for detecting an outlet pressure of the valve unit; and
    a third pressure sensor for detecting the pilot control pressure of the pilot control unit.

11. A pilot control unit for providing a pilot control pressure for a valve unit for regulated provision of a fluid, the pilot control unit comprising:
    at least one pilot control valve; and
    a control unit coupled to the pilot control unit;
    wherein the control unit regulates the at least one pilot control valve based on a combined parameter that describes an opening point of the pilot control valve;
    wherein the combined parameter is determined based on a static component and a dynamic component,
        wherein the control unit further regulates the at least one pilot control valve based on a parameter set involving adaptive parameters that describe a characteristic curve,
        wherein the parameter set is formed from the combined parameter,
        wherein the characteristic curve describes a relationship between an extent of an opening of the at least one pilot control valve and a control variable and is characterized by an opening point and a steepness of the curve,
        wherein the static component describes an individual variation determined by measuring, and
        wherein the dynamic component is temporally variable; and the control unit regulates the dynamic component based on a setpoint value-actual value comparison that relates to the pilot control pressure.

12. A method for adaptive, parameter-based regulation of a pilot control pressure for a valve unit to realize a regulated fluid, the method comprising the steps of:

determining a combined parameter that describes an opening point of at least one pilot control valve, including determining a static component and a dynamic component of the combined parameter,
electrically controlling the at least one pilot control valve based on the combined parameter, and
regulating the at least one pilot control valve with a control unit, based on a parameter set involving adaptive parameters that describe a characteristic curve,
wherein the parameter set is formed from the combined parameter,
wherein the characteristic curve describes a relationship between an extent of an opening of the at least one pilot control valve and a control variable and is characterized by an opening point and a steepness of the curve,
wherein the static component describes an individual variation determined by measuring, and
wherein the dynamic component is temporally variable; and the control unit regulates the dynamic component based on a setpoint value-actual value comparison that relates to the pilot control pressure.

13. The method according to claim 12, furthermore comprising:
adaptively adjusting the adaptive parameters for the extent of opening and the control variable, in accordance with an operating state of the valve unit.

14. The method according to claim 13, wherein the at least one pilot control valve embodies a first pilot control valve and a second pilot control valve; and wherein the methods further comprises:
controlling the first pilot control valve to increase the pilot control pressure; and controlling the second pilot control valve to reduce the pilot control pressure.

15. A non-transitory computer readable medium having instructions stored thereon that when operated within a data processing system, cause the data processing system to control a control unit of a pilot control unit for a valve unit, that is coupled to the data processing system, to carry out the steps of claim 12.

* * * * *